Patented Aug. 3, 1948

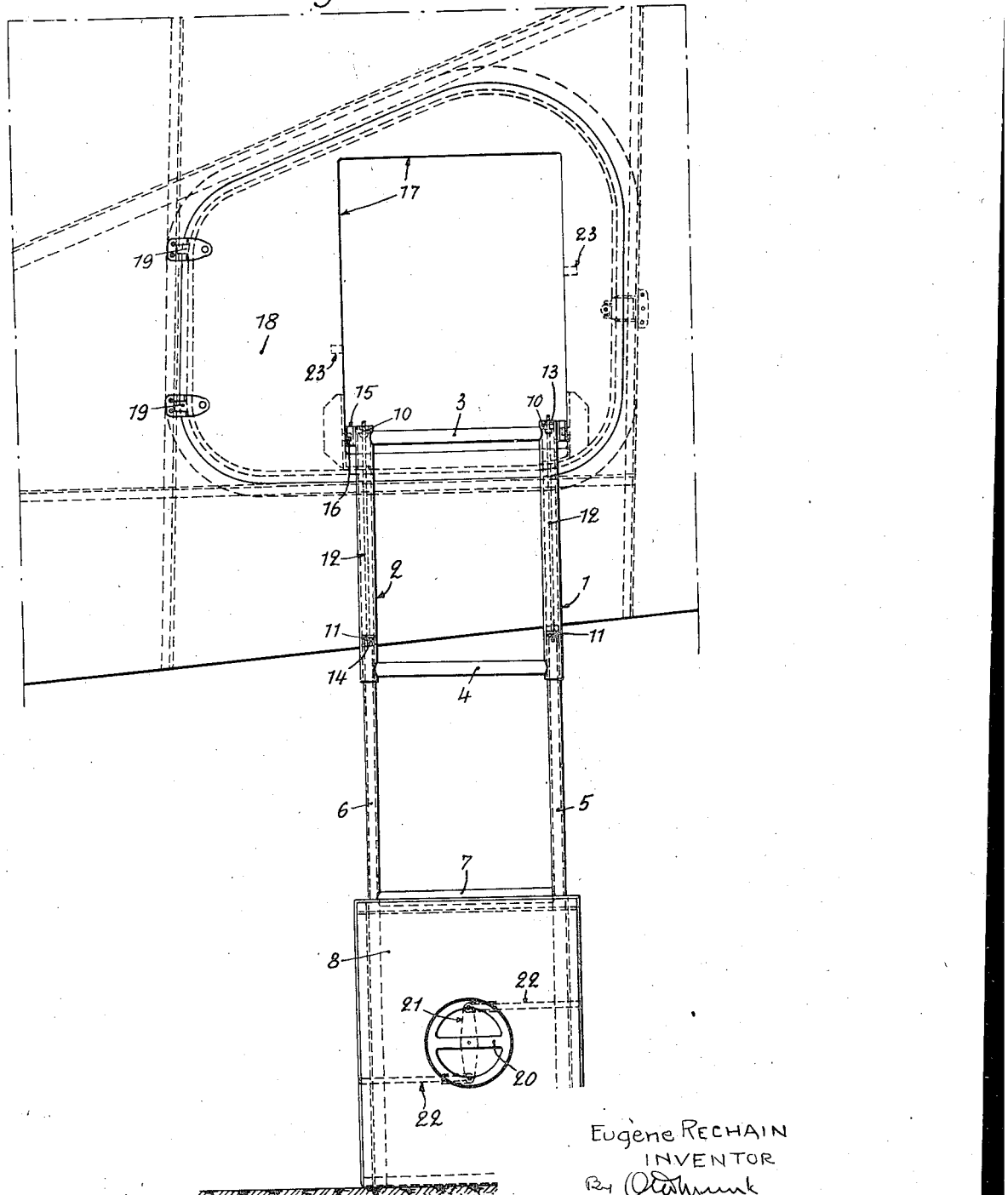

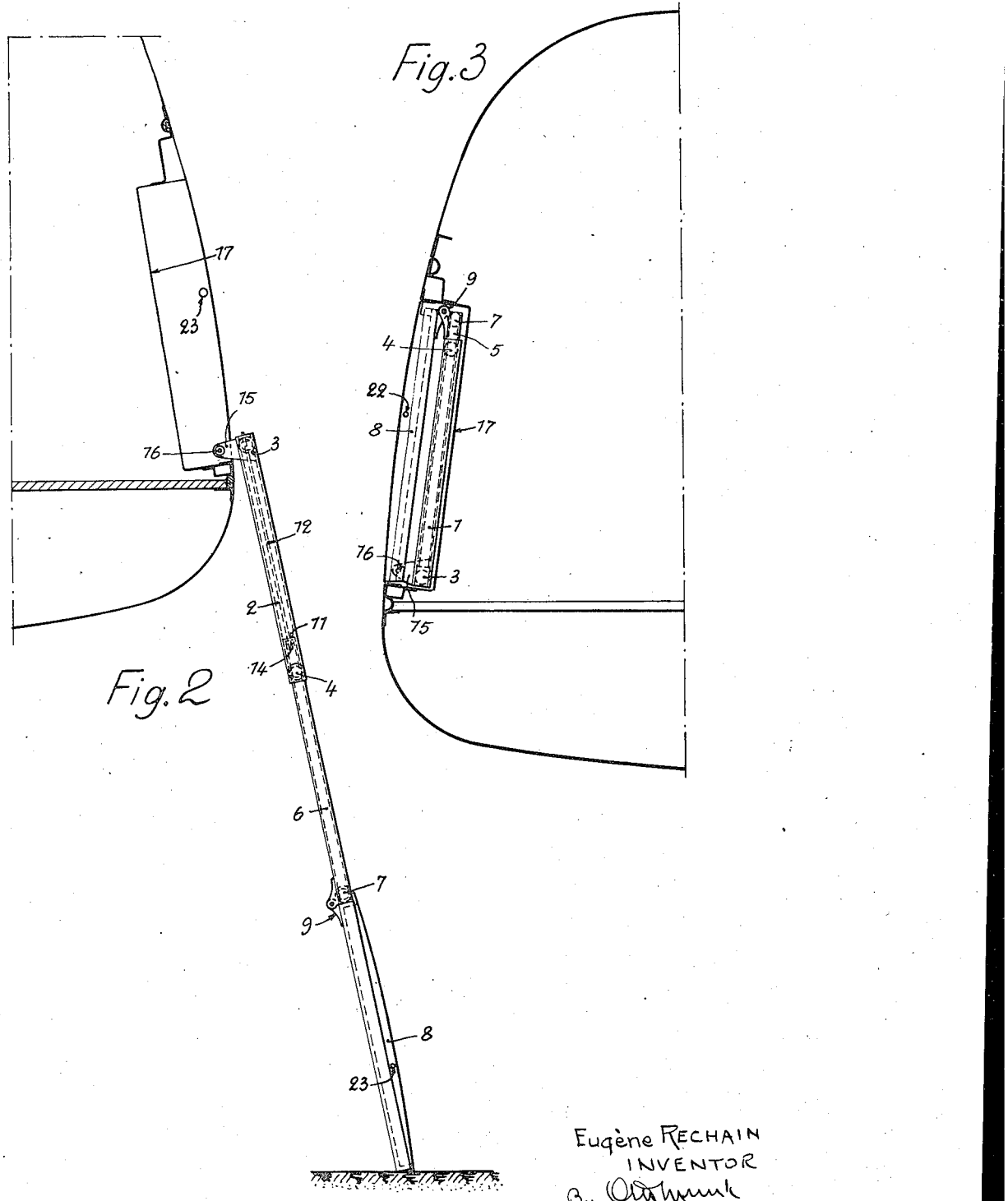

2,446,434

UNITED STATES PATENT OFFICE 2,446,434

APPLIANCE FOR THE ACCESS INTO STREAMLINE-SHAPED VEHICLES

Eugène Rechain, Neuilly-sur-Seine, France, assignor to Société Nationale de Constructions Aéronautiques du Nord, Paris, France Application August 17, 1945, Serial No. 611,028
In France September 17, 1942

Section 1, Public Law 690, August 8, 1946
Patent expires September 17, 1962

3 Claims. (Cl. 228—45)

The invention relates to an appliance for the access to streamline shaped vehicles, and in particular aircraft bodies.

The various means at present used for the access into aircraft bodies offer certain drawbacks. Thus, the stationary foot-boards or steps disposed under the aircraft body require a rather strong and, therefore, heavy structure; besides, they give rise to an important drag. On the other hand, the foot-boards or steps which are adapted to be folded together under the aircraft wing make the descent of the passengers difficult; moreover, the stresses undergone by this appliance produce after a certain time of service deformation of the wing near the body, which may be the cause of undesirable vibrations.

The present invention has for its object to devise an appliance for the access into aircraft or other streamline-shaped vehicles, in which the above drawbacks are eliminated. Said appliance essentially comprises a ladder, constituted by several elements so interconnected that they may be either folded together or developed in alignment, and a recess provided in the door of access to the aircraft body or any other place, for accommodating the ladder in folded up position. The outermost element of said ladder is preferably in the shape of a panel forming a cover for said recess.

Further features and advantages of the invention will be apparent from the following description, with reference to the accompanying drawings, which show, by way of example, an embodiment of the invention, and in which:

Fig. 1 is a front elevational view showing the door for the access into an aircraft body and the ladder in the unfolded position;

Fig. 2 is a side elevational view, showing the ladder in the same position;

Fig. 3 is a similar view showing the ladder folded together in the door recess.

Referring to the drawing, the appliance according to the invention comprises a rigid element formed by two tubular uprights 1, 2 and two rungs 3, 4. Uprights 1, 2 are telescopically united with tubular uprights 5, 6 connected together by a rung 7, thus forming a second ladder element. The lower ends of the uprights 5, 6 are attached to a panel 8 by means of hinges 9. In the unfolded position shown in Figs. 1 and 2, uprights 5, 6 are almost completely extracted from uprights 1, 2 and panel 8 is located in alignment with the two ladder elements; in the folded position shown in Fig. 3, uprights 5, 6 are completely pushed into uprights 1, 2 and the retracted elements 1, 2, 3, 4, 5, 6, 7 are rocked bodily about hinges 9 against panel 8.

Within uprights 1, 2 are preferably arranged coaxial cylindrical rods 12 which are secured at the top to upper plugs 10 closing uprights 1 and 2. Said rods 12 are loosely guided through upper plugs 11 at the top of uprights 5, 6 and are provided at their lower ends with a shoulder 14, which may be constituted by a nut screwed thereon. Shoulders 14 are adapted to bear against the lower faces of plugs 11, with a view to limit downward extension of the ladder and prevent the ladder elements from being separated.

Rods 12 are preferably screwed into plugs 10 and provided with a lock-nut 13, for locking them in place when shoulders 14 assume the proper position. They further assist telescopic movement of uprights 5, 6 within uprights 1, 2.

The door 18 is formed with a recess 17 and panel 8 is so arranged as to constitute a cover for said recess 17. With the ladder in its unfolded position, as shown in Figs. 1 and 2, folding of the latter is obtained by pushing uprights 5, 6 into uprights 1, 2, clapping panel 8 about the hinges 9 against uprights 1, 2 and locking the whole assembly thus folded about hinges 16, so as to insert the two ladder elements into the recess, and lay panel 8 on the inlet opening of the recess, thus closing the latter as shown in Fig. 3. Unfolding of the ladder takes place by reverse movements.

The device further comprises means for locking the ladder in the recess. In the embodiment shown in the drawing, this means comprises a handle 20, rotatably mounted on panel 8 and operatively connected with a lever 21, the ends of which are pivoted to latches 22 adapted to engage catches 23 provided in the sides of recess 17.

The device according to the invention has the following advantages:

Easy handling from the ground or from the aircraft body.

Perfect merging with the outer wall of the aircraft body, when folded together, whereby the aerodynamic qualities of the aircraft are not impaired.

Possibility of giving to the ladder the proper size for an easy access to the vehicle.

Obviously, the invention is not limited to the embodiment above described, which has been given only by way of example.

Having now described my invention what I claim as new and desire to secure by Letters Patent is:

1. A door and ladder unit for streamline-shaped vehicles, which comprises in combination a foldable ladder hingedly connected with said door, a recess in said door for accommodating said ladder in the folded up position thereof, and a foldable panel section hinged to said ladder at the end opposite to said door and adapted to form a cover for said recess, merging with outer walls of said door.

2. A door and ladder unit as claimed in claim 1 wherein said ladder comprises a telescoping section.

3. In a door and ladder unit as claimed in claim 1, latching means on said panel section and catch means in said door adapted to cooperate with said latching means.

EUGÈNE RECHAIN.

REFERENCES CITED

The following references are of record in the file of this patent:

UNITED STATES PATENTS

| Number | Name | Date |
|---|---|---|
| 519,184 | Holbrook | May 1, 1894 |
| 966,518 | Bessler | Aug. 9, 1910 |
| 1,721,521 | Marschke | July 23, 1929 |
| 1,805,829 | Marschke | May 19, 1931 |
| 2,037,805 | Lindstedt | Apr. 21, 1936 |